United States Patent
Xu et al.

(10) Patent No.: US 9,999,920 B2
(45) Date of Patent: Jun. 19, 2018

(54) ULTRAHIGH TEMPERATURE ELASTIC METAL COMPOSITES

(71) Applicants: Zhiyue Xu, Cypress, TX (US); Chengjiao Yu, Houston, TX (US); Lei Zhao, Houston, TX (US); Ke Wang, Sugar Land, TX (US)

(72) Inventors: Zhiyue Xu, Cypress, TX (US); Chengjiao Yu, Houston, TX (US); Lei Zhao, Houston, TX (US); Ke Wang, Sugar Land, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 355 days.

(21) Appl. No.: 14/676,864

(22) Filed: Apr. 2, 2015

(65) Prior Publication Data
US 2016/0288200 A1 Oct. 6, 2016

(51) Int. Cl.
*B22D 19/02* (2006.01)
*B22F 3/02* (2006.01)
(Continued)

(52) U.S. Cl.
CPC ............ *B22D 19/02* (2013.01); *B22D 19/14* (2013.01); *B22F 3/002* (2013.01); *B22F 3/02* (2013.01); *B22F 3/15* (2013.01); *B22F 3/20* (2013.01); *B22F 3/225* (2013.01); *B23K 1/0008* (2013.01); *B23K 31/02* (2013.01); *C21D 1/30* (2013.01); *C22C 1/1036* (2013.01); *C22C 32/0084* (2013.01); *C22C 32/0089* (2013.01); *C22C 32/0094* (2013.01); *C22C 47/08* (2013.01); *C22C 47/14* (2013.01); *C22C 49/14* (2013.01); *C25D 7/00* (2013.01); *C25D 15/00* (2013.01); *B22F 3/1055* (2013.01); (Continued)

(58) Field of Classification Search
CPC .... F16J 15/3232; F16J 15/3212; B22D 19/02; B22F 3/02
USPC ........................................................ 148/512
See application file for complete search history.

(56) References Cited

U.S. PATENT DOCUMENTS

| 2,439,424 A | 4/1948 | Goodloe et al. |
| 2,450,280 A | 9/1948 | Homon |

(Continued)

FOREIGN PATENT DOCUMENTS

| CN | 1382577 | 12/2002 |
| CN | 201613676 U | 10/2010 |

(Continued)

OTHER PUBLICATIONS

Courtois et al., "Mechanical Properties of Monofilament Entangled Materials", Advanced Engineering Materials, vol. 14, No. 12, 2012, pp. 1128-1133.
(Continued)

*Primary Examiner* — Weiping Zhu
(74) *Attorney, Agent, or Firm* — Cantor Colburn LLP (57) ABSTRACT

A metal composite comprises: a matrix comprising periodic metal springs; and a filler material comprising one or more of the following: a carbon composite; a polymer; a metal; graphite; cotton; asbestos; or glass fiber; wherein the filler material is bounded to the matrix via one or more of the following: a mechanical interlocking; a chemical bond; a solid solution; or an active layer disposed between the periodic metal springs and the filler material.

24 Claims, 3 Drawing Sheets (51) Int. Cl.
| | |
|---|---|
| B22F 3/15 | (2006.01) |
| B22F 3/20 | (2006.01) |
| B23K 1/00 | (2006.01) |
| B23K 31/02 | (2006.01) |
| C21D 1/30 | (2006.01) |
| C25D 7/00 | (2006.01) |
| B22D 19/14 | (2006.01) |
| C25D 15/00 | (2006.01) |
| B22F 3/00 | (2006.01) |
| B22F 3/22 | (2006.01) |
| C22C 1/10 | (2006.01) |
| C22C 32/00 | (2006.01) |
| C22C 47/08 | (2006.01) |
| C22C 47/14 | (2006.01) |
| C22C 49/14 | (2006.01) |
| B33Y 10/00 | (2015.01) |
| B33Y 80/00 | (2015.01) |
| B22F 3/24 | (2006.01) |
| B22F 3/105 | (2006.01) |

(52) U.S. Cl.
CPC ........ *B22F 2003/248* (2013.01); *B33Y 10/00* (2014.12); *B33Y 80/00* (2014.12); *Y02P 10/295* (2015.11)

(56) References Cited

U.S. PATENT DOCUMENTS

| | | | |
|---|---|---|---|
| 5,660,917 | A | 8/1997 | Fujimori et al. |
| 6,098,989 | A | 8/2000 | Caplain et al. |
| 6,352,264 | B1 | 3/2002 | Dalzell et al. |
| 8,197,930 | B1 | 6/2012 | Jacobson et al. |
| 8,230,913 | B2 | 7/2012 | Hart et al. |
| 8,354,170 | B1 | 1/2013 | Henry et al. |
| 9,527,261 | B1 | 12/2016 | Roper et al. |
| 9,726,300 | B2 * | 8/2017 | Zhao ................ F16K 41/04 |
| 2004/0146736 | A1 | 7/2004 | Ivanov et al. |
| 2005/0039992 | A1 | 2/2005 | Hurwic |
| 2005/0109502 | A1 | 5/2005 | Slay et al. |
| 2006/0080835 | A1 | 4/2006 | Kooistra et al. |
| 2011/0079962 | A1 * | 4/2011 | Munro .............. F16J 15/3212 277/500 |
| 2011/0193217 | A1 | 8/2011 | Meyer-Berg |
| 2012/0031616 | A1 | 2/2012 | Hall |
| 2013/0228099 | A1 | 9/2013 | Soba et al. |
| 2013/0300066 | A1 | 11/2013 | Xu et al. |
| 2016/0046095 | A1 | 2/2016 | Clough et al. |
| 2017/0144331 | A1 | 5/2017 | Yu et al. |

FOREIGN PATENT DOCUMENTS

| | | |
|---|---|---|
| CN | 103962479 | 8/2014 |
| EP | 1607653 | 12/2005 |
| RU | 1785474 | 12/1992 |
| RU | 2011460 | 4/1994 |
| RU | 2195381 | 12/2002 |
| RU | 2199413 | 2/2003 |
| RU | 2208496 | 7/2003 |
| SU | 1163951 | 6/1985 |
| SU | 1210944 | 2/1986 |

OTHER PUBLICATIONS

International Search Report and Written Opinion, International Application No. PCT/US2016/019551, dated Jun. 1, 2016, Korean Intellectual Property Office; International Search Report 5 pages, Written Opinion 8 pages.

Tan, Q., & He, G. "3D entangled wire reinforced metallic composites", Materials Science and Engineering A, 546, 233-238, 2012, pp. 1-6.

Vesenjak, Metaj, et al., "Characterization of irregular open-cell cellular structure with silicone pore filler", Polymer Testing 32 (2013) 1538-1544, pp. 1-7.

\* cited by examiner

ULTRAHIGH TEMPERATURE ELASTIC METAL COMPOSITES

BACKGROUND

This disclosure relates generally to metal composites, their methods of manufacture, and articles formed therefrom.

Metals have high corrosion resistance and excellent high pressure and high temperature tolerance. However, conventional metals are not ductile and have low elasticity, which can limit their application as seal materials. Elastomers are flexible but may break down and loose elasticity under high pressure and high temperature conditions. Thus the industry is always receptive to improved metal-based materials which have balanced stability, elasticity, and mechanical strength.

BRIEF DESCRIPTION

The above and other deficiencies in the prior art are overcome by, in an embodiment, a metal composite comprising: a matrix comprising periodic metal springs; and a filler material comprising one or more of the following: a carbon composite; a polymer; a metal; graphite; cotton; asbestos; or glass fiber; wherein the filler material is bounded to the matrix through one or more of the following: a mechanical interlocking; a chemical bond; a solid solution; or an active layer disposed between the periodic metal springs and the filler material.

A method of manufacturing a metal composite comprises: combining a matrix comprising periodic metal springs with a filler material; and forming the metal composite via one or more of the following: powder infiltration and sintering; compression molding; injection molding; extrusion molding; vacuum infiltration; vapor deposition; electrochemical deposition; hot isostatic pressing; casting; or brazing.

Articles comprising the metal composites are also disclosed.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have found that metal composites formed from a metal matrix comprising periodic metal springs and a filler material have improved balanced properties. Although conventional metals have low elasticity, when metal wires are winded to periodic springs, large structural elastic elongation of greater than about 50% to about 100% can be achieved. The periodic metal springs bind to filler materials through at least one of mechanical interlocking, chemical bonding, a solid solution, or an active layer disposed between the periodic metal springs and the filler material affording metal composites having excellent elasticity, high temperature rating, high corrosion resistance, and high extrusion resistance. The metal composites can also be tuned, for example, by controlling the materials for the metal springs and the filler, the winding patterns of the metal springs, and the percentage of porous spaces in the metal matrix to tailor the composites for use in a variety of applications.

The periodic metal springs are formed from metal wires. The wires can have a diameter of about 0.08 to about 0.5 mm. Suitable periodic metal springs have an average spring pitch of about 10 to about 15 times of the wire diameter, where the pitch of a spring refers to the distance from the center of one coil to the center of the adjacent coil. The average spring diameter is also about 10 to about 15 time of the wire diameter. As used herein, spring diameter refers to the outside diameter of the coil minus one wire diameter (d). Such a spring diameter is also commonly known as mean coil diameter. In an embodiment, the metal springs have an average spring pitch of about 0.8 to about 7.5 mm and an average spring diameter of about 0.8 to about 7.5 mm. The periodic metal springs can have a density of about 0.2 to about 4 $g/cm^3$. In an exemplary embodiment, metal springs are hollow members that have a wall thickness ranging from tens of nanometers to tens of microns (10 nanometers to 90 microns). In certain embodiments, metal springs are solid members. The periodic metal springs can be formed via three-dimensional printing techniques (also known as additive manufacturing), weaving, non-weaving, etching, micromachining, photolithography, projection microstereolithography, or other micromanufacturing processes known in the art.

The periodic metal springs comprise at least a corrosion resistant metal or a corrosion resistant metal alloy. Exemplary materials for the metal springs include one or more of the following: an iron alloy, a nickel-chromium based alloy, a nickel alloy, copper, or a shape memory alloy. An iron alloy includes steel such as stainless steel. Nickel-chromium based alloys include Inconel™. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel alloy includes Hastelloy™. Hastelloy is a trademarked name of Haynes International, Inc. As used herein, Hastelloy can be any of the highly corrosion-resistant superalloys having the "Hastelloy" trademark as a prefix. The primary element of the Hastelloy™ group of alloys referred to in the disclosure is nickel; however, other alloying ingredients are added to nickel in each of the subcategories of this trademark designation and include varying percentages of the elements molybdenum, chromium, cobalt, iron, copper, manganese, titanium, zirconium, aluminum, carbon, and tungsten. Shape memory alloy is an alloy that "remembers" its original shape and that when deformed returns to its pre-deformed shape when heated. Exemplary shape memory alloys include Cu—Al—Ni based alloys, Ni—Ti based alloys, Zn—Cu—Au—

Fe based alloys, and iron-based and copper-based shape memory alloys, such as Fe—Mn—Si, Cu—Zn—Al and Cu—Al—Ni.

Figure 1:
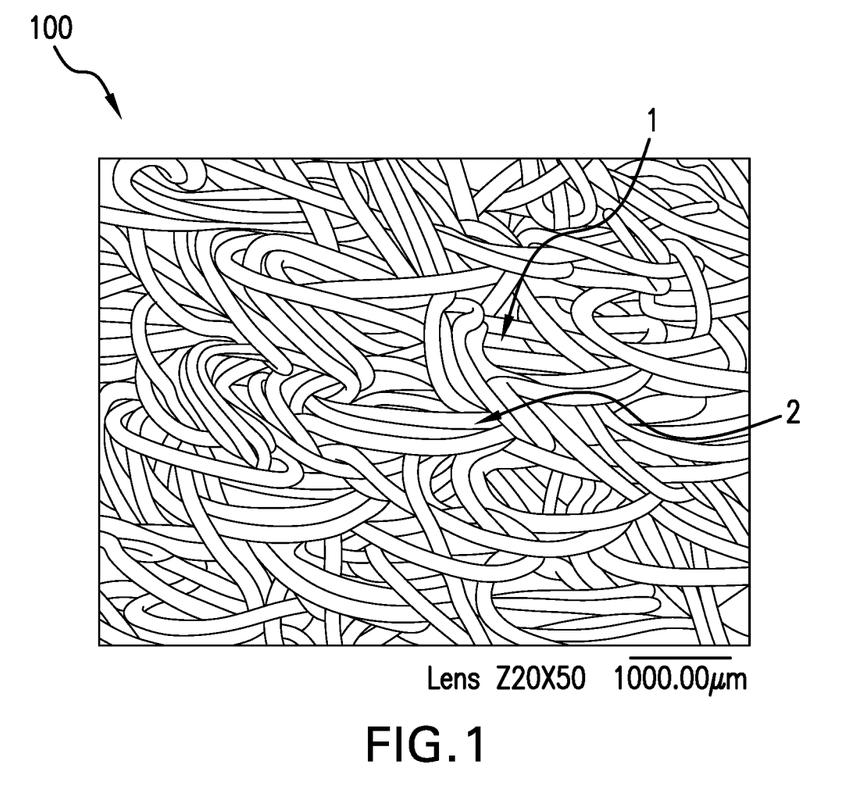
FIG. 1 is a microscopic view of a metal matrix comprising periodic metal springs according to an embodiment of the disclosure.

The periodic metal springs form a metal matrix. Accordingly, as used herein, a metal matrix refers to a combination of periodic metal springs including the open spaces created by the winding of metal wires. A microscopic view of a metal matrix according to an embodiment of the disclosure is shown in FIG. 1. As shown in FIG. 1, metal matrix 100 comprises periodic metal springs 2 and pores 1 among the metal springs.

Advantageously, the filler materials may enhance the sealing characteristics of the metal matrix while providing additional strength and rigidity. The filler materials can have similar or complimentary elastic properties of the matrix. Optionally the filler material has a high temperature rating. The filler materials in the metal composites comprise a carbon composite; a polymer; a metal; graphite; cotton; asbestos; or glass fibers. Combinations of the materials can be used. Optionally the filler materials contain reinforcement fibers, the reinforcement fibers being oriented in short, long, or continuous fibers, beads, or balloons. The volume ratio between the filler material and the metal matrix can vary depending on the applications. In an embodiment, the volume ratio of the metal matrix relative to the filler material is about 2.5%:97.5% to about 80%:20%, about 5%:95% to about 70%:30%, or about 10%:90% to about 60%:40%.

When the filler material is a carbon composite, the metal composite can have a temperature rating of greater than about 600° C. Carbon composites contain carbon and an inorganic binder. The carbon can be graphite such as natural graphite; synthetic graphite; expandable graphite; or expanded graphite; or a combination comprising at least one of the foregoing.

In an embodiment, the carbon composites comprise carbon microstructures having interstitial spaces among the carbon microstructures; wherein the binder is disposed in at least some of the interstitial spaces. The interstitial spaces among the carbon microstructures have a size of about 0.1 to about 100 microns, specifically about 1 to about 20 microns. A binder can occupy about 10% to about 90% of the interstitial spaces among the carbon microstructures.

The carbon microstructures can also comprise voids within the carbon microstructures. The voids within the carbon microstructures are generally between about 20 nanometers to about 1 micron, specifically about 200 nanometers to about 1 micron. As used herein, the size of the voids or interstitial spaces refers to the largest dimension of the voids or interstitial spaces and can be determined by high resolution electron or atomic force microscope technology. In an embodiment, to achieve high strength, the voids within the carbon microstructures are filled with the binder or a derivative thereof. Methods to fill the voids within the carbon microstructures include vapor deposition.

The carbon microstructures are microscopic structures of graphite formed after compressing graphite into highly condensed state. They comprise graphite basal planes stacked together along the compression direction. As used herein, carbon basal planes refer to substantially flat, parallel sheets or layers of carbon atoms, where each sheet or layer has a single atom thickness. The graphite basal planes are also referred to as carbon layers. The carbon microstructures are generally flat and thin. They can have different shapes and can also be referred to as micro-flakes, micro-discs and the like. In an embodiment, the carbon microstructures are substantially parallel to each other.

The carbon microstructures have a thickness of about 1 to about 200 microns, about 1 to about 150 microns, about 1 to about 100 microns, about 1 to about 50 microns, or about 10 to about 20 microns. The diameter or largest dimension of the carbon microstructures is about 5 to about 500 microns or about 10 to about 500 microns. The aspect ratio of the carbon microstructures can be about 10 to about 500, about 20 to about 400, or about 25 to about 350. In an embodiment, the distance between the carbon layers in the carbon microstructures is about 0.3 nanometers to about 1 micron. The carbon microstructures can have a density of about 0.5 to about 3 g/cm$^3$, or about 0.1 to about 2 g/cm$^3$.

In the carbon composites, the carbon microstructures are held together by a binding phase. The binding phase comprises a binder which binds carbon microstructures by mechanical interlocking. Optionally, an interface layer is formed between the binder and the carbon microstructures. The interface layer can comprise chemical bonds, solid solutions, or a combination thereof. When present, the chemical bonds, solid solutions, or a combination thereof may strengthen the interlocking of the carbon microstructures. It is appreciated that the carbon microstructures may be held together by both mechanical interlocking and chemical bonding. For example the chemical bonding, solid solution, or a combination thereof may be formed between some carbon microstructures and the binder or for a particular carbon microstructure only between a portion of the carbon on the surface of the carbon microstructure and the binder. For the carbon microstructures or portions of the carbon microstructures that do not form a chemical bond, solid solution, or a combination thereof, the carbon microstructures can be bounded by mechanical interlocking. The thickness of the binding phase is about 0.1 to about 100 microns or about 1 to about 20 microns. The binding phase can form a continuous or discontinuous network that binds carbon microstructures together.

Exemplary binders include a nonmetal, a metal, an alloy, or a combination comprising at least one of the foregoing. The nonmetal is one or more of the following: $SiO_2$; Si; B; or $B_2O_3$. The metal can be at least one of aluminum; copper; titanium; nickel; tungsten; chromium; iron; manganese; zirconium; hafnium; vanadium; niobium; molybdenum; tin; bismuth; antimony; lead; cadmium; or selenium. The alloy includes one or more of the following: aluminum alloys; copper alloys; titanium alloys; nickel alloys; tungsten alloys; chromium alloys; iron alloys; manganese alloys; zirconium alloys; hafnium alloys; vanadium alloys; niobium alloys; molybdenum alloys; tin alloys; bismuth alloys; antimony alloys; lead alloys; cadmium alloys; or selenium alloys. In an embodiment, the binder comprises one or more of the following: copper; nickel; chromium; iron; titanium; an alloy of copper; an alloy of nickel; an alloy of chromium; an alloy of iron; or an alloy of titanium. Exemplary alloys include steel, nickel-chromium based alloys such as Inconel*, and nickel-copper based alloys such as Monel alloys. Nickel-chromium based alloys can contain about 40-75% of Ni and about 10-35% of Cr. The nickel-chromium based alloys can also contain about 1 to about 15% of iron. Small amounts of Mo, Nb, Co, Mn, Cu, Al, Ti, Si, C, S, P, B, or a combination comprising at least one of the foregoing can also be included in the nickel-chromium based alloys. Nickel-copper based alloys are primarily composed of nickel (up to about 67%) and copper. The nickel-copper based alloys can also contain small amounts of iron, manganese, carbon, and silicon. These materials can be in different shapes, such as particles, fibers, and wires. Combinations of the materials can be used.

The binder used to make the carbon composite is micro- or nano-sized. In an embodiment, the binder has an average particle size of about 0.05 to about 250 microns, about 0.05 to about 100 microns, about 0.05 to about 50 microns, or about 0.05 to about 10 microns. Without wishing to be bound by theory, it is believed that when the binder has a size within these ranges, it disperses uniformly among the carbon microstructures.

When an interface layer is present, the binding phase comprises a binder layer comprising a binder and an interface layer bonding one of the at least two carbon microstructures to the binder layer. In an embodiment, the binding phase comprises a binder layer, a first interface layer bonding one of the carbon microstructures to the binder layer, and a second interface layer bonding the other of the at least two microstructures to the binder layer. The first interface layer and the second interface layer can have the same or different compositions.

The interface layer comprises one or more of the following: a C-metal bond; a C—B bond; a C—Si bond; a C—O—Si bond; a C—O-metal bond; or a metal carbon solution. The bonds are formed from the carbon on the surface of the carbon microstructures and the binder.

In an embodiment, the interface layer comprises carbides of the binder. The carbides include one or more of the following: carbides of aluminum; carbides of titanium; carbides of nickel; carbides of tungsten; carbides of chromium; carbides of iron; carbides of manganese; carbides of zirconium; carbides of hafnium; carbides of vanadium; carbides of niobium; or carbides of molybdenum. These carbides are formed by reacting the corresponding metal or metal alloy binder with the carbon atoms of the carbon microstructures. The binding phase can also comprise SiC formed by reacting $SiO_2$ or Si with the carbon of carbon microstructures, or $B_4C$ formed by reacting B or $B_2O_3$ with the carbon of the carbon microstructures. When a combination of binder materials is used, the interface layer can comprise a combination of these carbides. The carbides can be salt-like carbides such as aluminum carbide, covalent carbides such as SiC and $B_4C$, interstitial carbides such as carbides of the group 4, 5, and 6 transition metals, or intermediate transition metal carbides, for example the carbides of Cr, Mn, Fe, Co, and Ni.

In another embodiment, the interface layer comprises a solid solution of carbon such as graphite and a binder. Carbon has solubility in certain metal matrix or at certain temperature ranges, which can facilitate both wetting and binding of a metal phase onto the carbon microstructures. Through heat-treatment, high solubility of carbon in metal can be maintained at low temperatures. These metals include one or more of Co; Fe; La; Mn; Ni; or Cu. The binder layer can also comprise a combination of solid solutions and carbides.

The carbon composites comprise about 20 to about 95 wt. %, about 20 to about 80 wt. %, or about 50 to about 80 wt. % of carbon, based on the total weight of the composites. The binder is present in an amount of about 5 wt. % to about 75 wt. % or about 20 wt. % to about 50 wt. %, based on the total weight of the composites. In the carbon composites, the weight ratio of carbon relative to the binder is about 1:4 to about 20:1, or about 1:4 to about 4:1, or about 1:1 to about 4:1.

The carbon composites can optionally comprise a reinforcing agent. Exemplary reinforcing agent includes one or more of the following: carbon fibers; carbon black; mica; clay; glass fibers; ceramic fibers; or ceramic hollow structures. Ceramic materials include SiC, $Si_3N_4$, $SiO_2$, BN, and the like. The reinforcing agent can be present in an amount of about 0.5 to about 10 wt. % or about 1 to about 8%, based on the total weight of the carbon composite.

Filler materials other than carbon composites can also be used in the metal composites of the disclosure. Other suitable filler materials for the metal composites include a soft metal, soft metal alloy, or a combination comprising one or more of the foregoing. Exemplary metals for the filler material include one or more of the following: aluminum; copper; lead; bismuth; gallium; cadmium; silver; gold; rhodium; thallium; tin; alloys thereof; or a eutectic alloy. A eutectic alloy is one for which the melting point is as low as possible and all the constituents of the alloy crystallize simultaneously at this temperature from the liquid state.

The filler materials for the metal composites can also be a polymer such as a thermosetting polymer, a thermoplastic polymer or a combination comprising at least one of the foregoing. As used herein, polymers include both synthetic polymers and natural polymers. Polymers also include crosslinked polymers. When the filler material is a polymer, the metal composite can have a recoverable deformation of greater than about 30%.

Exemplary polymers for the filler material include acrylonitrile butadiene rubber (NBR); hydrogenated nitrile butadiene (HNBR); acrylonitrile butadiene carboxy monomer (XNBR); ethylene propylene diene monomer (EPDM); fluorocarbon rubber (FPM); FEKM; perfluorocarbon rubber (FFKM); tetrafluoro ethylene/propylene rubbers (FEPM); an aliphatic polyamide such as nylon, polyethylene, polytetrafluoroethylene (PTFE) such as Teflon®; polyphenylene sulfide (PPS) such as Ryton® or crosslinked polyphenylene sulfide; or polycarbonate.

The filler materials are bounded to the metal springs via mechanical interlocking; or chemical bonding; either directly or through an active interface layer between the surfaces of the metal springs and the filler materials. The binding between periodic metal springs and filler materials facilitates transferring loads between the metal springs and the filler materials. Advantageously, optimum binding allows for compatibility and integrity of the different materials of metal springs and the filler materials under loading conditions. Weak interfacial bounding may not be sufficient for load distribution and transformation as delamination or cracks may occur and destroy the integrity of the composite, while excessive interfacial bounding may lead to a rigid composite, which compromises the elasticity of the metal matrix.

When the filler materials comprise a carbon composite or a metal, the filler materials can be bounded to the periodic metal springs via at least one of a solid solution or intermetallic compounds formed between the metal in the periodic metal springs and the metal in the filler material. Advantageously, a solid solution is formed providing robust binding between the filler material and the metal springs. When the filler materials comprise a polymer, the filler materials can be bounded to the metal springs through mechanical interlocking.

The periodic metal springs can be used without surface processing or can be processed, including chemically, physically, or mechanically treating the surfaces of the metal springs. For example, the metal springs can be treated to roughen or increase a surface area of the metal springs, e.g., by sanding, lapping, or sand blasting. Surfaces of the metal springs can also be cleaned to remove contaminants through chemical and/or mechanical means. In an embodiment, the surfaces of the metal springs are treated with a primer or an adhesive to facilitate the binding between the metal springs and the filler materials. Chemicals for treatment may include, but are not limited to organofunctional silanes, or any other suitable chemicals. In another embodiment, when the filler materials comprise a polymer, the metal springs can be first coated with a layer of metal oxide, and then the polymeric filler materials can be subsequently bonded to the metal oxide.

Figure 2:
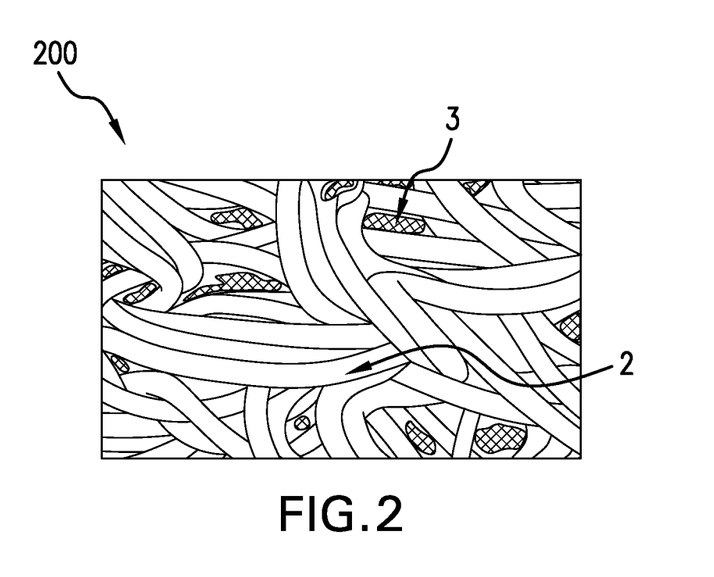
FIG. 2 shows an exemplary embodiment of a metal composite, which comprises a metal matrix and a filler material disposed in the pores of the metal matrix.

The filler materials can be impregnated into the matrix and at least partially fill the open spaces among the periodic metal springs. In an embodiment, a filler material occupies about 10% to about 90%, about 20% to about 80%, or about 30% to about 85% of the open spaces among the periodic metal springs. FIG. 2 shows an exemplary embodiment of a metal composite 200. The metal composite comprises periodic metal springs 2 and a filler material 3 disposed in the open spaces among the metal springs 2.

Alternatively, the filler materials can be disposed on the outer surface of the metal matrix to at least partially encapsulate the metal matrix. For example the filler materials can form a coating on the surface of the metal matrix. The thickness of the coating is about 10 μm to about 100 μm or about 0.1 mm to about 50 mm. At least partially encapsulated metal composites provide enhanced sealing performance while allowing a load to be supported. Further, the amount of filler is reduced allowing for weight and cost savings. The volume ratio of the metal matrix relative to the filler material for the at least partially encapsulated metal composite is about 2.5%:10% to about 80%:10%, or about 2.5%:90% to about 80%:15%.

Figure 3:
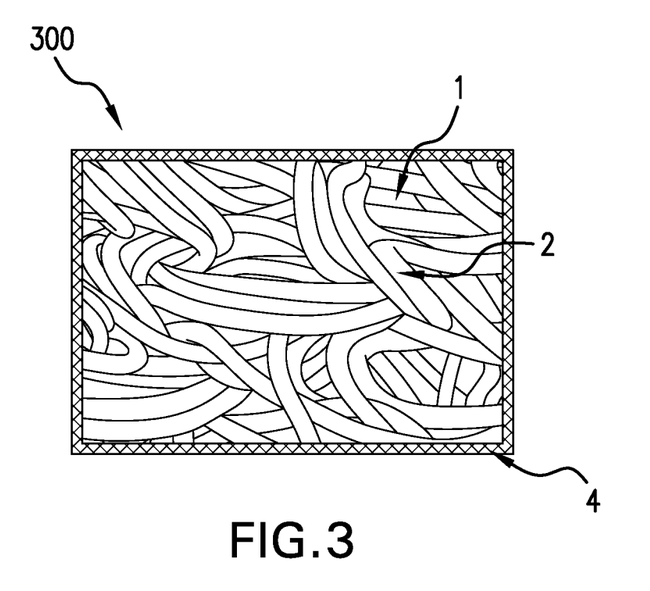
FIG. 3 shows an exemplary embodiment of a metal composite, which comprises a metal matrix and a filler material at least partially encompassing the metal matrix.

In an embodiment, the filler material does not occupy the open spaces in the metal matrix. However, if desired, the filler material can at least partially occupy the open spaces in the metal matrix. FIG. 3 shows an exemplary embodiment of a metal composite 300. The metal composite comprises periodic metal springs 2 and a filler material 4 encapsulating the matrix formed by the periodic metal springs.

Figure 4:
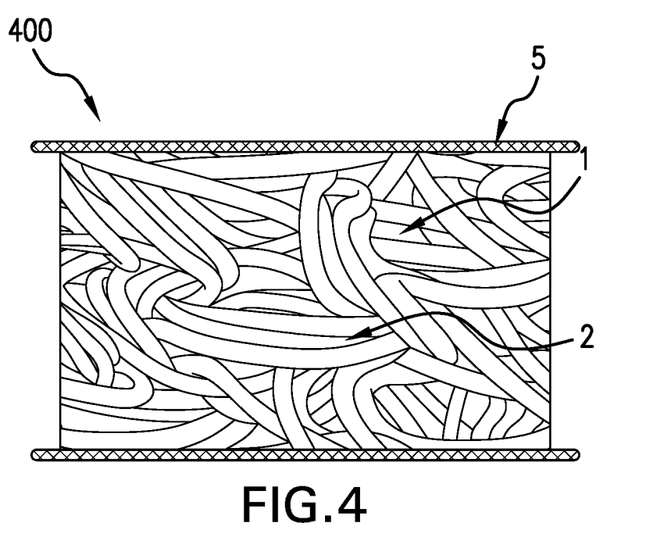
FIG. 4 shows a metal composite comprising a metal matrix disposed between two layers formed from a filler material.

In another embodiment, the metal matrix is disposed between two layers formed from the filler materials. Such an arrangement allows for advantageous sealing properties, while supporting load along an interface in a desired direction. Further, the amount of the filler material is reduced allowing for weight and cost savings. For example, the volume ratio of the metal matrix relative to the filler material for the design is about 2.5%:10% to about 80%:10%, or about 2.5%:90% to about 80%:15%. FIG. 4 shows an exemplary embodiment of a metal composite 400. The metal composite comprises a metal matrix which contains periodic metal springs 2 sandwiched between two layers 5 formed from a filler material.

The metal composites are manufactured via one or more of the following: powder infiltration and sintering; compression molding; injection molding; extrusion molding; vacuum infiltration; vapor deposition; electrochemical deposition; hot isostatic pressing; casting; or brazing.

To make metal composites containing filler materials disposed in the open spaces of the metal matrix, the filler materials is impregnated into the open space in the matrix, optionally under superatmospheric or subatmospheric pressures. Optionally, plasticizers, surfactants, and lubricants are utilized during the manufacturing process to facilitate the penetration or infiltration of the filler material into the open spaces in the metal matrix. Binders in the form of particles, fibers, or other shape may also be mixed with the filler material in certain ratios to facilitate bonding between the metal springs and the filler material. If desired, such plasticizers and lubricants can be removed after the manufacturing process. In certain embodiments, suspensions with micro- or nano-sized particles of the filler materials are utilized. The impregnated metal matrix can be sintered at a suitable elevated temperature. Pressure may be applied based on the filler material and the material of the metal springs. In other embodiments, a filler material is introduced into the metal matrix via injection molding, compression molding, extrusion molding, brazing, casting, vapor deposition, electrochemical deposition, hot isostatic pressing, and the like. In some embodiments, it may be desirable to release residual stress in the metal composites by a heat treatment. For example, a metal composite prepared through a sintering process can be heated at a temperature that is about 20 to 50° C. below the sintering temperature. The heat treatment temperature and the sintering temperature can be determined by a person skilled in the art without undue experimentation.

To make at least partially encapsulated metal composites, an encapsulation layer can be formed first from the filler material; and the encapsulation layer is then sintered or molded with the matrix to form the metal composites. Alternatively or in addition, the encapsulation layer is laminated or brazed to the metal matrix thus forming the composite. In another embodiment, a method of making the metal composite comprises forming two layers from the filler material; disposing the matrix between the two layers; and forming the composite via one or more of the following: sintering; compression molding; or brazing. It is appreciated that the encapsulation layer or the filler layers do not have to be formed at a separate step. For example, a mold can be loaded with a first filler material, the periodic metal springs, and a second filler material to provide a combination. Then the combination is pressed at an elevated temperature to provide the metal composites comprising a metal matrix disposed between two layers formed from filler materials.

Figure 5:
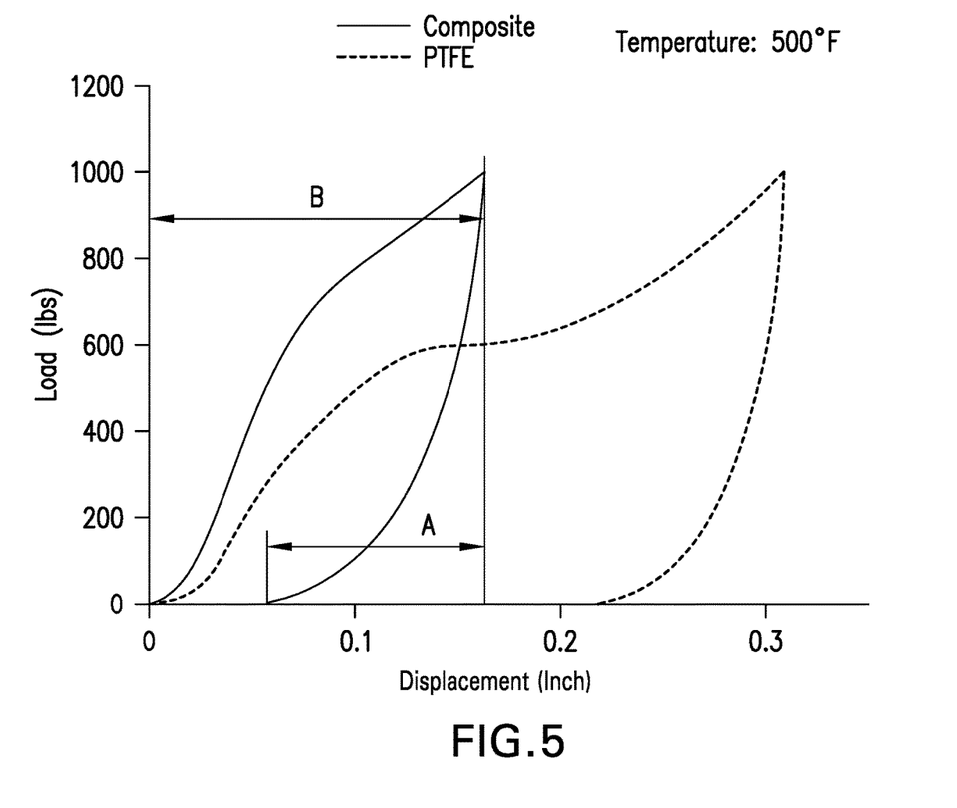
FIG. 5 shows load displacement curves for an exemplary embodiment of the metal composite (solid line) and a polymer PTFE (dotted line).

The metal composites of the disclosure have excellent elasticity. FIG. 5 shows the load displacement curve for an exemplary embodiment of a metal composite. Both pure PTFE and PTFE-periodic metal springs composite materials were tested through uniaxial compression tests (loading and unloading at 1000 pounds load). The elastic recovery ratio can be defined as elastic or recoverable displacement A over total displacement B. The composite material has less total displacement and higher elastic recovery ratio (64.3%), while the pure PTFE has larger total displacement and less elastic recovery ratio (44%).

The metal composites are useful for preparing articles for a wide variety of applications. The metal composites may be used to form all or a portion of an article. Accordingly, articles comprising the metal composites are provided.

The metal composites can be used in sealing applications. Illustrative sealing elements include, for example, seals such as static seals or dynamic seals; seal seats; packoffs seals such as retrievable cementing packoff, polished bore receptacle packoff, wireline packoff; packers; joint sheets; gaskets; bridge plugs; packing, such as pump packing, valve packing, or the like. There can be overlap among different types of sealing elements. Static seals refer to seals between two stable and immovable components and include C-rings, E-rings, O-rings, U-rings, T-rings, L-rings, rectangular rings, square rings, x-sectioned rings, and the like. Dynamic seals are not particularly limited and include any seals between a pair of relatively movable members. A gasket is a mechanical seal which fills the space between two or more mating surfaces. Exemplary gaskets include high performance gaskets subject to pressure and heat, for example, head gaskets and exhaust gaskets for automobiles and flange gaskets for refineries. The sealing elements have excellent elastic properties. Thus they can fill in the gaps and imperfections in the surfaces to be sealed providing fluid-tight or airtight seals. The sealing elements can further have high heat resistance and durability and can be used in a wide temperature ranges.

The articles can be a downhole element. Illustrative articles include seals, high pressure beaded frac screen plugs, screen base pipe plugs, coatings for balls and seats, compression packing elements, expandable packing elements, O-rings, bonded seals, bullet seals, sub-surface safety valve seals, sub-surface safety valve flapper seal, dynamic seals, V-rings, back-up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, and sleeves.

The metal composites have a high thermal resistance with a range of operation temperatures from about −65° F. up to about 1200° F. Accordingly, the downhole articles such as packers can be used to produce hydrocarbons from a subterranean location having an ambient temperature of greater than 750° F. or greater than 1000° F. In an embodiment, the articles of the disclosure are continuously resistive to one or more of thermal cracking, thermal degradation or thermal decomposition, at an ambient temperature of greater than 750° F. for more than 30 days. As used herein, "continuously resistive" means that less than about 10 wt. %, less than about 5 wt. %, less than about 2 wt. %, or less than about 1 wt. % of the carbon composite or the article containing the carbon composite is thermally cracked, thermally degraded, and/or thermally decomposed.

The downhole articles can also be used to isolate or complete a wellbore. The method comprises deploying an apparatus comprising one or more of the downhole articles in a wellbore. For example, the article can be of a type suited for filling an annulus within a borehole in a location surrounding one or more production tubulars. As used herein, the term "production tubulars" is defined to include, for example, any kind of tubular that is used in completing a well, such as, but not limited to, production tubing, production casing, intermediate casings, and devices through which hydrocarbons flow to the surface. Examples of such article include, in non-limiting embodiments, annular isolators used to block off non-targeted production or water zones, and the like.

The articles can be made directly from a composition containing a metal matrix and a filler material by shaping or machining or a combination thereof. Shaping includes molding, extruding, casting, and laminating. Machining includes cutting, sawing, ablating, milling, facing, lathing, boring, and the like using, for example, a miller, saw, lathe, router, electric discharge machine, and the like.

All ranges disclosed herein are inclusive of the endpoints, and the endpoints are independently combinable with each other. "Or" means "and/or." As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A metal composite comprising:
   a metal matrix comprising periodic metal springs and open spaces among the periodic metal springs; and
   a filler material comprising one or more of the following: a carbon composite; a polymer; a metal; graphite; cotton; asbestos; or glass fiber;
   wherein the filler material is bounded to the metal matrix via one or more of the following: a mechanical interlocking; a chemical bond; a solid solution; or an active layer disposed between the periodic metal springs and the filler material; and
   the filler material occupies about 10% to about 90% of the open spaces among the periodic metal springs.

2. The metal composite of claim 1, wherein the filler material occupies about 20% to about 80% of the open spaces among the periodic metal springs.

3. The metal composite of claim 1, wherein the periodic metal springs comprise coil springs having an average spring pitch of about 0.8 to about 7.5 mm and an average spring diameter of about 0.8 to about 7.5 mm.

4. The metal composite of claim 1, wherein the periodic metal springs have an average wire diameter of about 0.08 to about 0.5 mm.

5. The metal composite of claim 1, wherein the periodic metal springs have a density of about 0.2 to about 4 g/cm$^3$.

6. The metal composite of claim 1, wherein the periodic metal springs comprise one or more of the following: an iron alloy; a nickel-chromium based alloy; a nickel alloy; copper; or a shape memory alloy.

7. The metal composite of claim 1, wherein the carbon composite of the filler material comprises carbon and a binder containing one or more of the following: $SiO_2$; Si; B; $B_2O_3$; a metal; or an alloy of the metal; and wherein the metal is one or more of the following: aluminum; copper; titanium; nickel; tungsten; chromium; iron; manganese; zirconium; hafnium; vanadium; niobium; molybdenum; tin; bismuth; antimony; lead; cadmium; or selenium.

8. The metal composite of claim 7, wherein the carbon in the carbon composite comprises one or more of the following: expanded graphite; expandable graphite; natural graphite; or synthetic graphite.

9. The metal composite of claim 1, wherein the metal of the filler material comprises one or more of the following: aluminum; copper; tin; or a eutectic alloy.

10. The metal composite of claim 1, wherein the polymer of the filler material comprises one or more of the following: an acrylonitrile butadiene rubber; hydrogenated nitrile butadiene; acrylonitrile butadiene carboxy monomer; ethylene propylene diene monomer; fluorocarbon rubber; perfluorocarbon rubber; tetrafluoro ethylene/propylene rubbers; an aliphatic polyamide; polyethylene; polytetrafluoroethylene; polyphenylene sulfide or crosslinked polyphenylene sulfide; or polycarbonate.

11. The metal composite of claim 1, wherein the filler material further comprises a reinforcement agent.

12. The metal composite of claim 1, wherein the filler material forms a coating at least partially encapsulating the matrix.

13. The metal composite of claim 1, wherein the matrix is disposed between two layers formed from the filler material.

14. The metal composite of claim 1, wherein the volume ratio of the matrix relative to the filler is about 2.5%:97.5% to about 80%:20%.

15. A method of manufacturing the metal composite of claim 1, the method comprising:
combining a matrix comprising periodic metal springs with a filler material; and
forming the metal composite via one or more of the following: powder infiltration and sintering; compression molding; injection molding; extrusion molding; vacuum infiltration; vapor deposition; electrochemical deposition; hot isostatic pressing; casting; or brazing.

16. The method of claim 15, wherein the method further comprises forming the matrix by a process comprising one or more of the following: micromachining; three-dimensional printing; weaving; non-weaving; photolithography; projection microstereolithography; etching; or a micromanufacturing process.

17. The method of claim 15, further comprising heating the metal composite at atmospheric pressure to release residual stress.

18. The method of claim 15 comprising:
forming two layers from the filler material;
disposing the matrix between the two layers; and
forming the composite via one or more of the following: sintering; compression molding; or brazing.

19. The method of claim 15 comprising:
forming an encapsulation layer from the filler material;
disposing the encapsulation layer around the matrix; and
forming the composite via one or more of the following: sintering; compression molding; or brazing.

20. An article comprising the metal composite of claim 1.

21. The article of claim 20, wherein the article is a downhole element comprising a seal; a high pressure beaded frac screen plug; a screen base pipe plug; a coating for balls and seats; a compression packing element; an expandable packing element; an O-ring; a bonded seal; a bullet seal; a sub-surface safety valve seal; a sub-surface safety valve flapper seal; a dynamic seal; a V-ring; a back-up ring; a drill bit seal; a liner port plug; an atmospheric disc; an atmospheric chamber disc; a debris barrier; a drill in stim liner plug; an inflow control device plug; a flapper; a seat; a ball seat; a direct connect disk; a drill-in linear disk; a gas lift valve plug; a fluid loss control flapper; an electric submersible pump seal; a shear out plug; a flapper valve; a gaslift valve; or a sleeve.

22. A metal composite comprising:
a metal matrix comprising periodic metal springs; and
a filler material comprising one or more of the following: a carbon composite; a polymer; a metal; graphite; cotton; asbestos; or glass fiber;
wherein the filler material is bounded to the metal matrix via one or more of the following: a chemical bond; a solid solution; or an active layer disposed between the periodic metal springs and the filler material.

23. The metal composite of claim 22, wherein the filler material comprises a carbon composite or a metal; and the filler material is bounded to the metal matrix via a chemical bond, a solid solution, or a combination comprising at least one of the foregoing.

24. The metal composite of claim 22, wherein the filler material comprises a carbon composite and is bounded to the metal matrix via at least one of a solid solution or intermetallic compounds formed between a metal in the period metal springs and a metal in the carbon composite.

* * * * *